(12) United States Patent
Kaijala

(10) Patent No.: US 7,373,845 B2
(45) Date of Patent: *May 20, 2008

(54) SEAT BELT TENSION SENSOR

(75) Inventor: Murray Kaijala, Elkhart, IN (US)

(73) Assignee: CTS Corporation, Elkhart, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 11/818,332

(22) Filed: Jun. 14, 2007

(65) Prior Publication Data

US 2007/0240525 A1 Oct. 18, 2007

Related U.S. Application Data

(63) Continuation-in-part of application No. 11/803,886, filed on May 16, 2007, which is a continuation of application No. 11/288,856, filed on Nov. 29, 2005, now Pat. No. 7,222,545, which is a continuation of application No. 10/388,816, filed on Mar. 14, 2003, now Pat. No. 7,086,297, which is a continuation-in-part of application No. 09/923,151, filed on Aug. 6, 2001, now Pat. No. 6,578,432, which is a continuation of application No. 09/884,615, filed on Jun. 19, 2001, now Pat. No. 6,647,811.

(51) Int. Cl.
  *G01L 1/26* (2006.01)
  *G01L 5/04* (2006.01)
(52) U.S. Cl. ............................................... 73/862.391
(58) Field of Classification Search ............ 73/862.391
  See application file for complete search history.

(56) References Cited

U.S. PATENT DOCUMENTS

| | | | |
|---|---|---|---|
| 2,984,102 | A | 5/1961 | Soderholm |
| 3,805,600 | A | 4/1974 | Powell et al. |
| 4,616,504 | A | 10/1986 | Overcash et al. |
| 4,943,087 | A | 7/1990 | Sasaki |
| 5,060,977 | A | 10/1991 | Saito |
| 5,181,739 | A | 1/1993 | Bauer et al. |
| 5,244,231 | A | 9/1993 | Bauer |
| 5,309,135 | A | 5/1994 | Langford |
| 5,454,591 | A | 10/1995 | Mazur et al. |
| 5,494,311 | A | 2/1996 | Blackburn |
| 5,570,903 | A | 11/1996 | Meister |
| 5,583,476 | A | 12/1996 | Langford |
| 5,605,348 | A | 2/1997 | Blackburn |
| 5,618,056 | A | 4/1997 | Schoos |
| 5,636,864 | A | 6/1997 | Hori |
| 5,765,774 | A | 6/1998 | Maekawa |

(Continued)

FOREIGN PATENT DOCUMENTS

WO  WO99/12012  3/1999

*Primary Examiner*—Edward Lefkowitz
*Assistant Examiner*—Octavia Davis
(74) *Attorney, Agent, or Firm*—Mark P. Bourgeois

(57) ABSTRACT

A seat belt tension sensor for use with a seat belt assembly. The sensor includes a housing that has a slot and a plate coupled with the housing. The plate has another slot and a cutout. The slots are connected with a seat belt. A sensor is retained by the housing and extends into the cutout. A portion of the plate is adapted to be engaged by the sensor as tension is increased on the seat belt. The sensor generates an electrical signal that is indicative of seat belt tension.

20 Claims, 6 Drawing Sheets

U.S. PATENT DOCUMENTS

| | | |
|---|---|---|
| 5,960,523 A | 10/1999 | Husby |
| 5,965,827 A | 10/1999 | Stanley |
| 5,996,421 A | 12/1999 | Husby |
| 6,081,759 A | 6/2000 | Husby |
| 6,151,540 A | 11/2000 | Anishetty |
| 6,161,439 A | 12/2000 | Stanley |
| 6,205,868 B1 | 3/2001 | Miller |
| 6,209,915 B1 | 4/2001 | Blakesley |
| 6,211,668 B1 | 4/2001 | Duesler |
| 6,230,088 B1 | 5/2001 | Husby |
| 6,264,236 B1 | 7/2001 | Aoki |
| 6,264,281 B1 | 7/2001 | Dukatz |
| 6,301,977 B1 | 10/2001 | Stojanovski |
| 6,307,977 B1 | 10/2001 | Eldridge et al. |
| 6,311,571 B1 * | 11/2001 | Norton .................. 73/862.637 |
| 6,336,371 B1 | 1/2002 | O'Boyle |
| 6,400,145 B1 | 6/2002 | Chamings et al. |
| 6,405,607 B2 * | 6/2002 | Faigle et al. ........... 73/862.391 |
| 6,447,010 B1 | 9/2002 | Curtis et al. |
| 6,450,534 B1 | 9/2002 | Blakesley |
| 6,508,114 B2 | 1/2003 | Lawson |
| 6,520,540 B1 | 2/2003 | Siegfried et al. |
| 6,554,318 B2 | 4/2003 | Kohut |
| 6,578,432 B2 | 6/2003 | Blakesley |
| 6,647,811 B2 | 11/2003 | Blakesley |
| 6,662,670 B2 | 12/2003 | Clark |
| 6,688,185 B2 | 2/2004 | Knox et al. |
| 6,729,194 B2 | 5/2004 | Kaijala |
| 6,749,038 B2 | 6/2004 | Sullivan et al. |
| 6,776,056 B2 | 8/2004 | Garver |
| 6,858,835 B2 | 2/2005 | Smith |
| 6,860,160 B2 | 3/2005 | Curtis et al. |
| 6,903,286 B2 | 6/2005 | Kaijala et al. |
| 7,055,400 B2 | 6/2006 | Curtis et al. |
| 7,086,297 B2 | 8/2006 | Blakesley et al. |
| 7,116,008 B2 | 10/2006 | Kitamura et al. |
| 2000/0042981 | 11/2001 | Kohut |
| 2001/0054323 A1 | 12/2001 | Faigle et al. |
| 2002/0024205 A1 | 2/2002 | Curtis |
| 2002/0035878 A1 | 3/2002 | Norton |
| 2003/0066362 A1 | 4/2003 | Lee et al. |
| 2003/0150283 A1 | 8/2003 | Stanley et al. |
| 2003/0184076 A1 | 10/2003 | Devereaux et al. |
| 2004/0017073 A1 | 1/2004 | Pavlov et al. |
| 2004/0231436 A1 | 11/2004 | Barnabo et al. |

* cited by examiner

SEAT BELT TENSION SENSOR

CROSS REFERENCE TO RELATED AND CO-PENDING APPLICATIONS

This application is a continuation in part of U.S. patent application Ser. No. 11/803,886 filed May 16, 2007 and titled, "Seat Belt Tension Sensor Having Shock Isolation", which is a continuation of U.S. patent application Ser. No. 11/288,856 filed Nov. 29, 2005 and titled, "Seat Belt Tension Sensor Having Shock Isolation", now U.S. Pat. No. 7,222,545, which is a continuation of U.S. patent application Ser. No. 10/388,816 filed Mar. 14, 2003 and titled, "Seat Belt Tension Sensor Having Shock Isolation", now U.S. Pat. No. 7,086,297, which is a continuation in part of U.S. patent application Ser. No. 09/923,151 filed Aug. 6, 2001 and titled, "Seat Belt Tension Sensor", now U.S. Pat. No. 6,578,432, which is a continuation of U.S. patent application Ser. No. 09/884,615 filed Jun. 19, 2001 and titled, "Seat Belt Tension Sensor", now U.S. Pat. No. 6,647,811.

The foregoing patents have the same assignee as the present application and are herein incorporated by reference in entirety.

BACKGROUND OF THE INVENTION

1. Field of the Invention

This invention relates to an automobile sensor for detecting the magnitude of a tensile force in a seat belt used in a car seat, and in particular to a sensor that can detect the magnitude of tension in a seat belt and provide an electrical signal that is representative of the magnitude of tensile force.

2. Description of the Related Art

Air bags have been heralded for their ability to reduce injuries and save lives. However, since their incorporation into automobiles, a problem has existed with people of smaller size and small children. Air bags are designed to cushion the impact of occupants and thus reduce the injuries suffered. However, the force needed to properly cushion the occupant varies based on the size and position of the person.

For example, a larger person requires the bag to inflate faster and thus with more force. A smaller person may be injured by a bag inflating at this higher inflation force. A smaller person is more likely to be sitting close to the dashboard and would therefore stand a higher chance of being injured by the impact of the inflating bag, as opposed to the passenger hitting the fully inflated bag to absorb the impact of the accident. An average-sized person can also be injured by an airbag inflation if they are leaning forward, as for example, if they are adjusting the radio.

Because of the concern over injury to passengers in these situations, the National Highway Transportation Safety Administration (or NHTSA), an administrative agency of the United States, is instituting rules requiring the air bag deployment system to identify the passenger size and position and inflate the air bag accordingly.

One way to accomplish this task is to use a seat belt tension sensor in conjunction with an occupant weight sensor. The weight sensor can provide an indication of the force placed by an occupant on the seat. However, if the seat belt is unduly tightened, it can place an additional downward force on the passenger, creating an erroneous weight reading. Similarly, it is common for infant car seats to be secured tightly to the seat. In this circumstance, it is critical for the system to recognize that the passenger does not warrant inflation of the air bag. By sensing the tension on the seat belt in addition to the weight reading from the seat, the actual weight of the occupant can be determined. This allows for the system to safely deploy the air bag.

SUMMARY OF THE INVENTION

It is a feature of the present invention to provide a seat belt tension sensor for use with a seat belt assembly. The sensor includes a housing that has a first slot and a plate coupled with the housing. The plate has a second slot and a cutout. The first and second slots are adapted to be connected with a seat belt. A sensor is retained by the housing and extends into the cutout. A first portion of the plate is adapted to be engaged by the sensor as tension is increased on the seat belt. The sensor generates an electrical signal that is indicative of seat belt tension.

DETAILED DESCRIPTION

Figure 1:
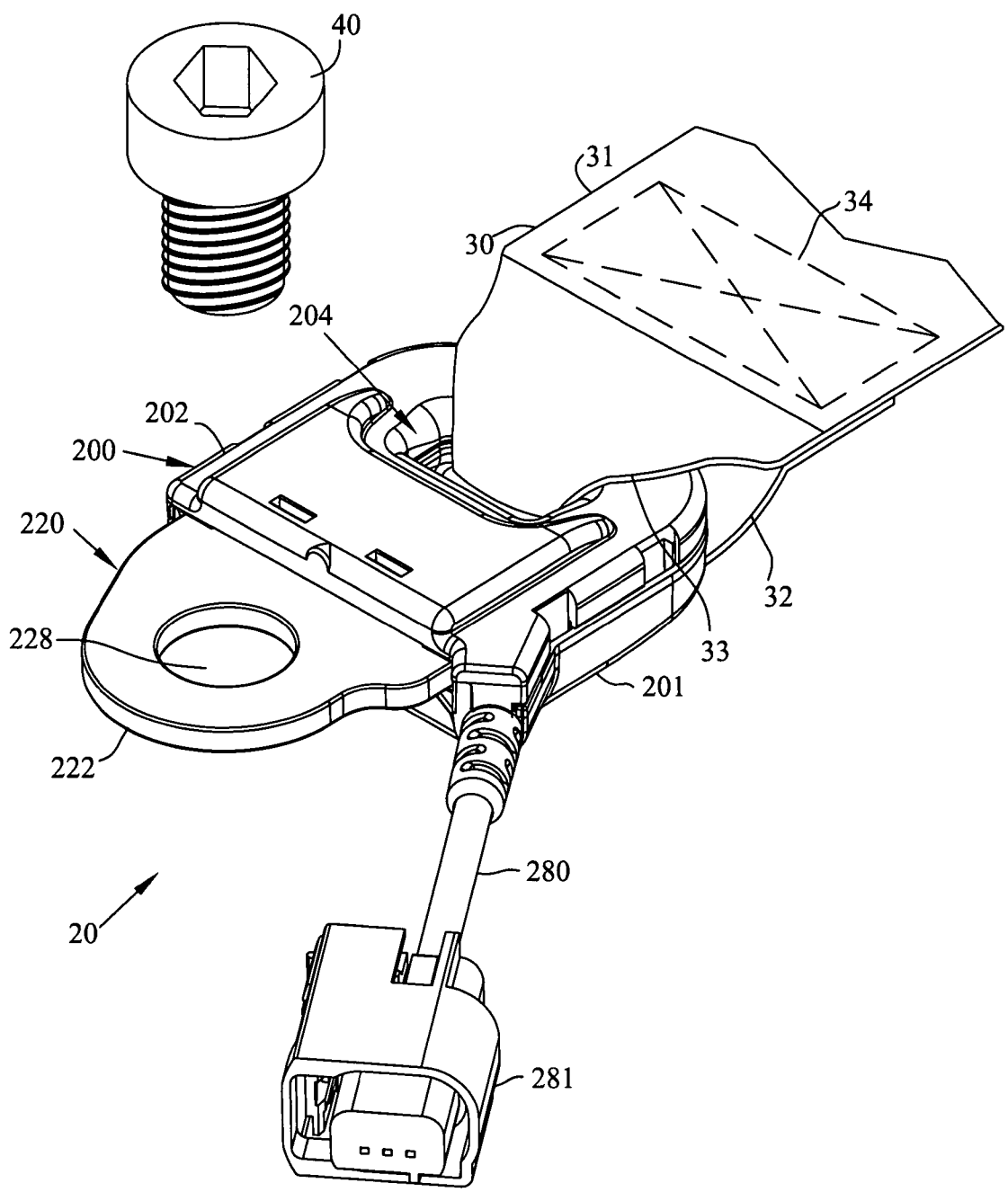
FIG. 1 is substantially an overall perspective assembled view of a seat belt tension sensor in accordance with the present invention.
Figure 2:
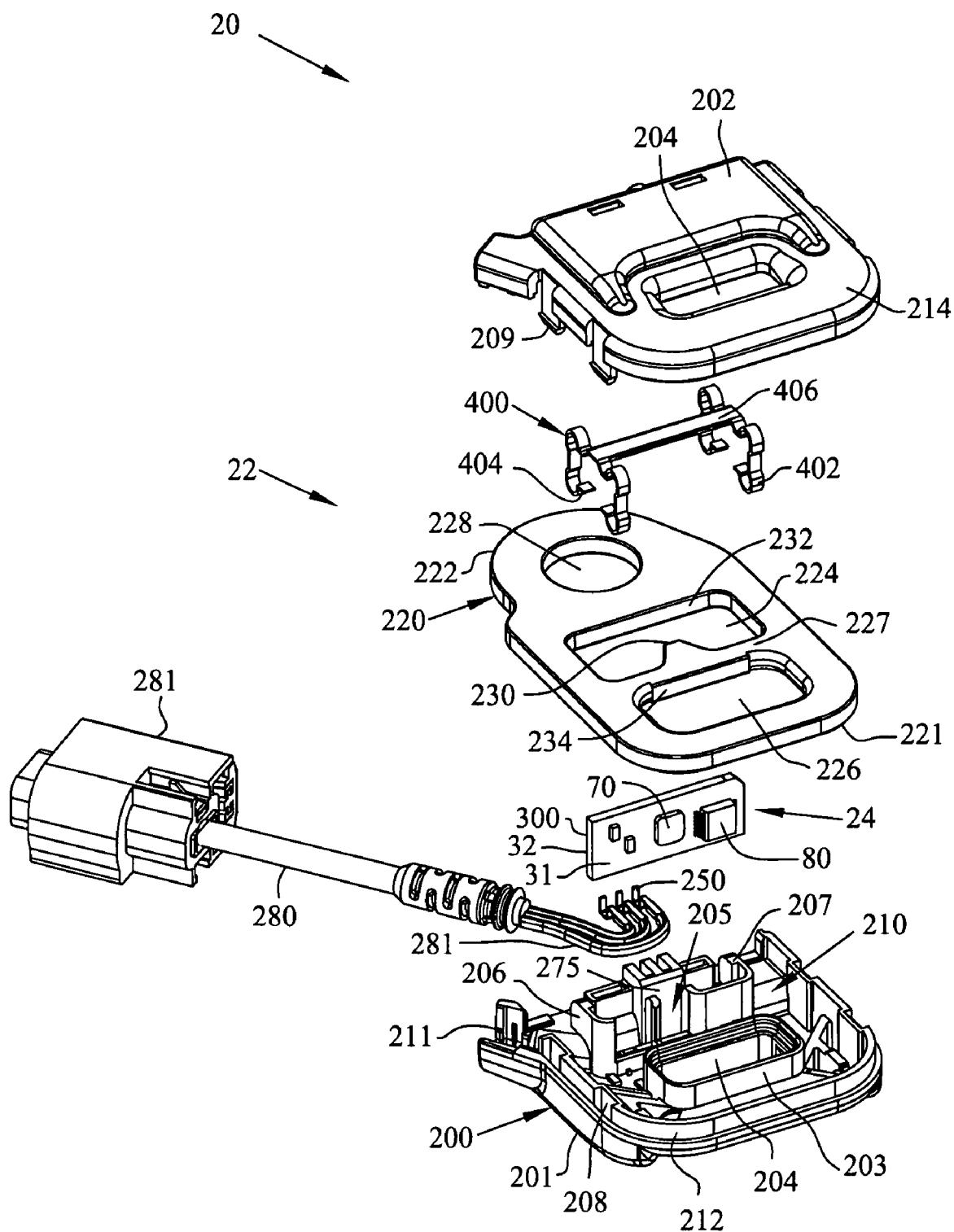
FIG. 2 is substantially a perspective exploded view of the seat belt tension sensor of FIG. 1.
Figure 3:
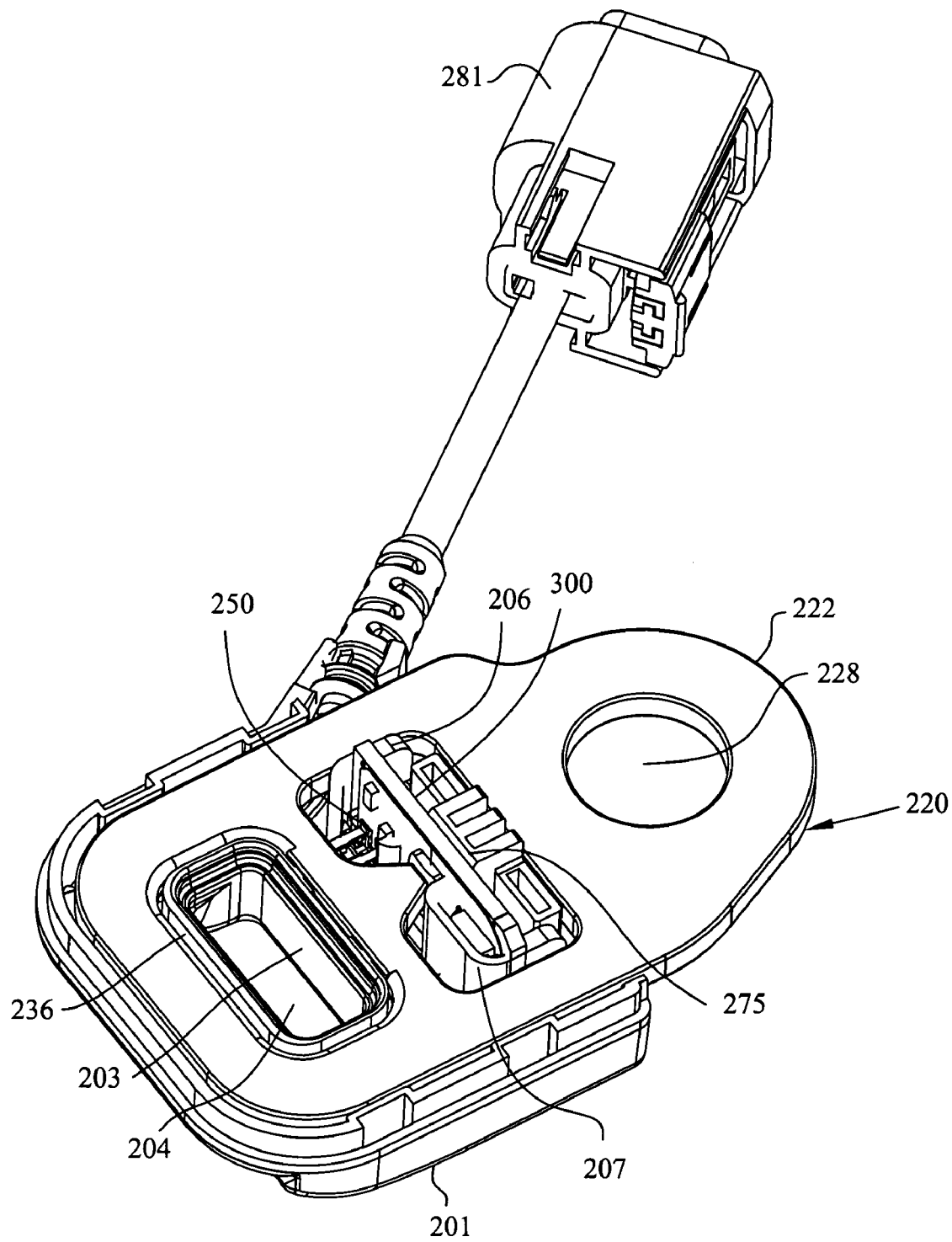
FIG. 3 is substantially a perspective partial assembled view of FIG. 1 without the cover.
Figure 4:
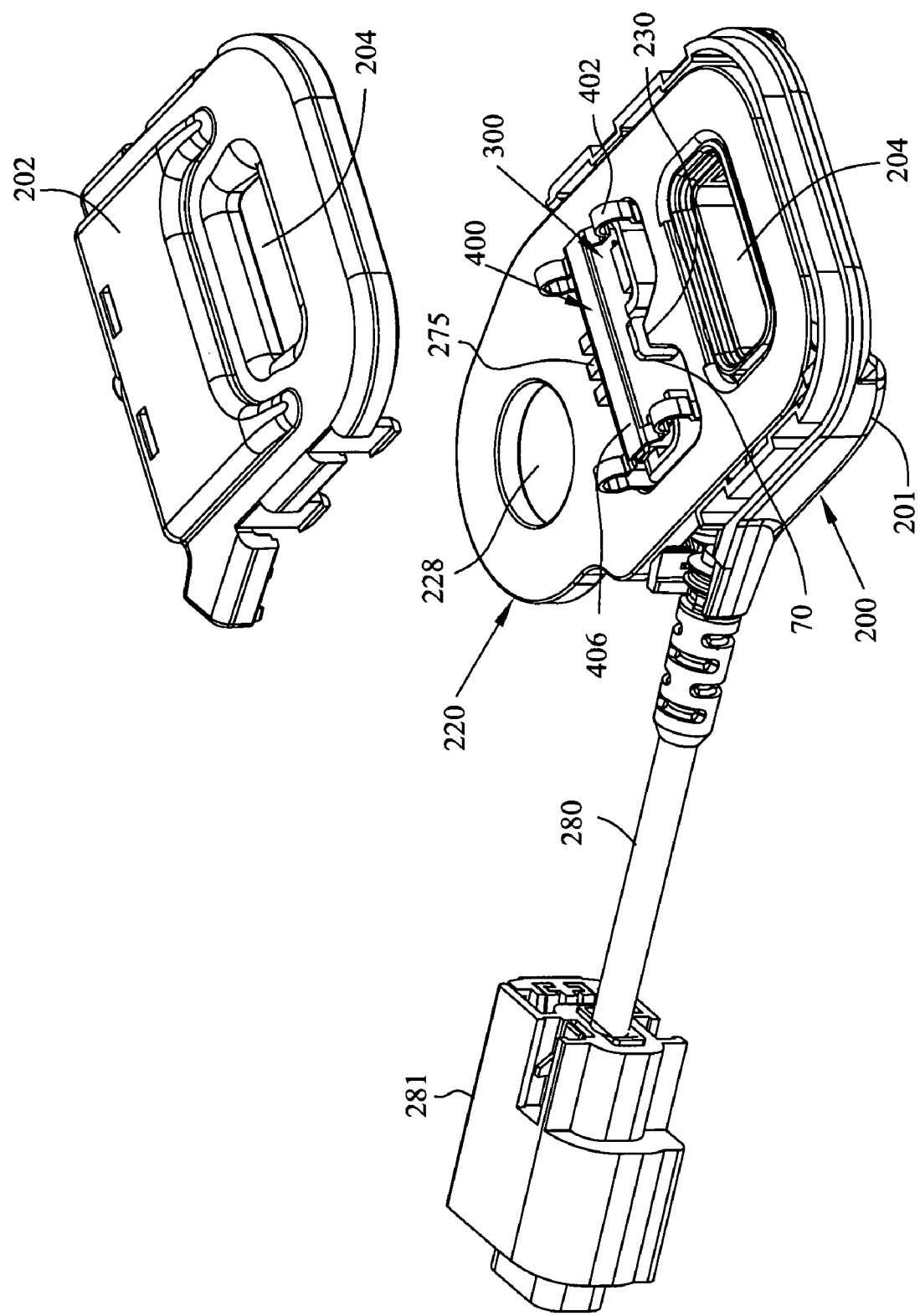
FIG. 4 is substantially another perspective partial assembled view of FIG. 1 without the cover.

Referring to FIGS. 1-4, a seat belt tension sensor assembly 20 shown. Assembly 20 has a limit structure 22 and a sensor 24. An overload limit structure 22 is fastened between a seat belt webbing 30 and a structural part of the vehicle such as a floor (not shown). The belt webbing 30 has an end 31, an end 32, a belt loop 33 and stitching 34 that retains end 32.

The overload limit structure 22 includes a housing 200, an anchor plate 220 and a strain sensor or member 300. Housing 200 has a bottom portion 201, top portion 202, flange 203, hole 204, slot 205 and posts 206 and 207. A cavity 210 is located within housing 200. Posts 206 and 207 retain strain sensor 300 in slot 205. Housing 200 has a cable groove, snap-fit tab 208 and snap-fit slot 209 and an upwardly extending lip 212. Housing 200 has a narrow portion 214 on an end of the housing.

Anchor plate 220 is loosely fitted in cavity 210 between bottom portion 201 and top portion 202. After bottom portion 201 and top portion 202 are snapped together using snap-fit tab 208 and snap-fit slot 209, anchor plate 220 is retained in housing 200.

Anchor plate 220 includes ends 221 and 222, a cutout 224, aperture 226, aperture 228 and edge 234. Arm 227 extends between aperture 226 and cutout 224. A projection 230 extends from arm 227 into cutout 224. Cutout 224 has a side 232. The anchor plate 220 is located in cavity 210. Aperture 226 goes over and surrounds flange 203. A gap 236 is formed between flange 203 and edge 234

Seat belt webbing 30 is attached through hole 204 and aperture 226. The end 32 of webbing 30 is routed through holes 204 and aperture 226, wrapped back onto itself forming loop 33 and sewn with stitching 34 to secure the seat belt webbing to assembly 20.

Sensor 24 has a strain sensor 300 that is mounted in slot 205. Strain sensor 300 has a front side 31, back side 32, actuator 370 and signal conditioning electronics 380.

Details of the construction and operation of strain sensor 300 are shown in U.S. patent application Ser. No. 11/484,929, filed Jul. 12, 2006 and titled, "Compression Strain Sensor", the contents of which are herein incorporated by reference.

Figure 5:
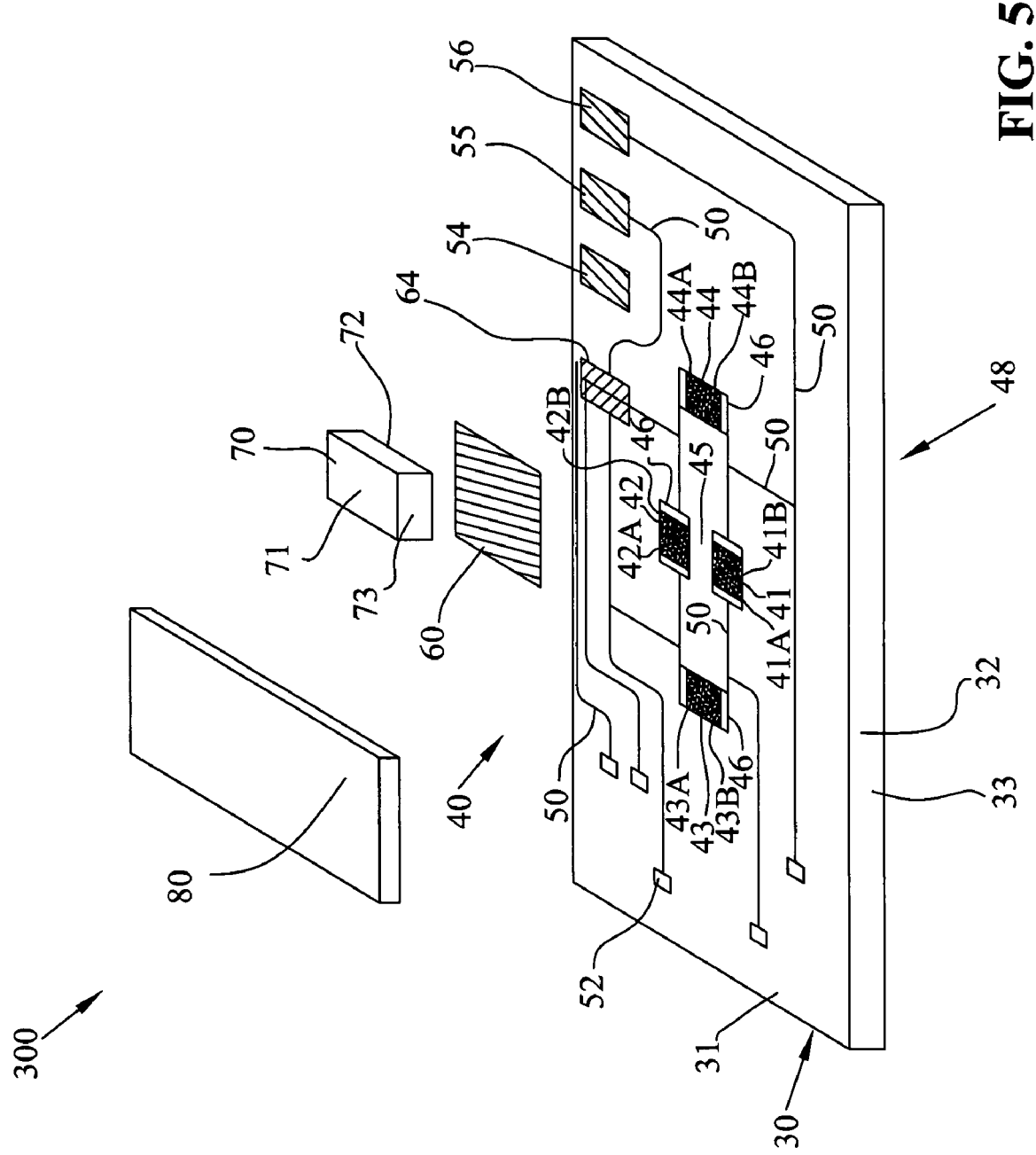
FIG. 5 is substantially a perspective exploded view of a strain sensor.
Figure 6:
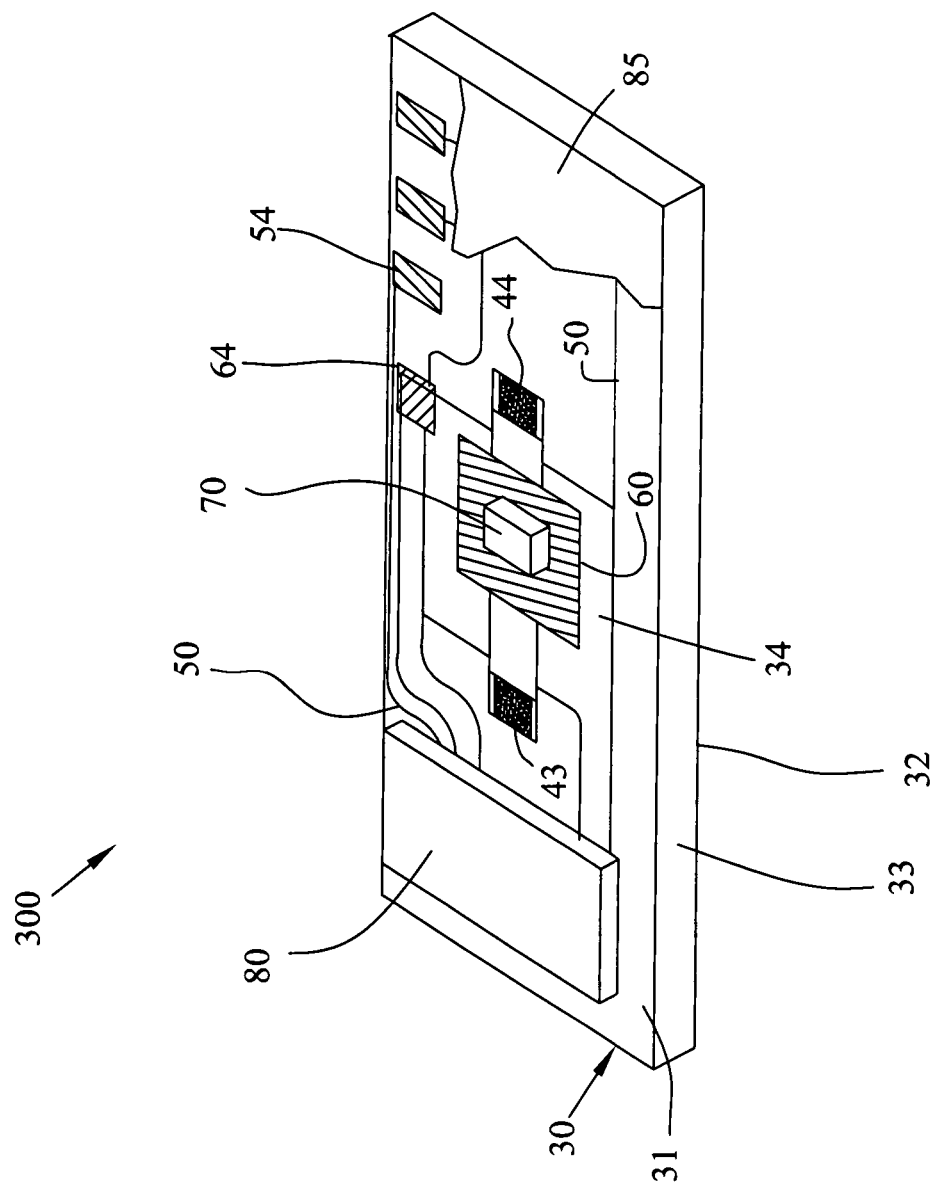
FIG. 6 is substantially a perspective view of a strain sensor.

Turning now to FIGS. 5 and 6, details of the construction of strain sensor 300 are shown. Strain sensor 300 has a ceramic substrate 30 with a top surface 31, bottom surface 32, side surfaces 33 and a central area 34. Ceramic substrate 30 can be formed from a wide variety of ceramic materials such as aluminum oxide, aluminum nitride and silicon carbide.

Several strain or pressure sensitive resistors 40 can be located on top surface 31 in central area 34. Resistors 40 include individual resistors 41, 42, 43 and 44. Each resistor has a pair of ends. Resistor 41 has ends 41A and 41B. Resistor 42 has ends 42A and 42B. Resistor 43 has ends 43A and 43B. Resistor 44 has ends 44A and 44B. A space 45 is located between resistors 41 and 42. Conductors 46 are mounted on top surface 31 and are attached to each end of each of the resistors.

Circuit lines 50 are mounted on top surface 31. Some of the circuit lines 50 are attached with conductors 46 such that the resistors 40 are connected into a wheatstone bridge 48. Several circuit lines 50 are connected with mounting pads 52 that are located on top surface 31. Mounting pads 52 are used to connect to signal processing electronics that are mounted on substrate 30. Circuit lines 50 are also connected with terminals 54, 55 and 56 that are located on top surface 31. Terminal 54 is connected to a source of power. Terminal 55 is connected to ground. Terminal 56 is a data signal terminal.

An insulating dielectric layer 60 is mounted over resistors 64 and 66 and a portion of top surface 31 in central area 34. Another insulating dielectric layer 64 is mounted over one of the circuit lines 50 and on a portion of top surface 31 in order to provide and insulated path for another circuit line 50 to be routed.

A overcoat 85 can be applied over top surface 31, resistors 43, 44 and circuit lines 50 in order to prevent corrosion and damage. Overcoat 85 can be formed from an organic insulating overcoat material.

A ceramic actuator or load transfer device 70 is mounted to dielectric layer 60. Actuator 70 has a top 71, bottom 72 and sides 73. Ceramic actuator 70 can be placed onto dielectric layer 60 after the dielectric layer has been screened, but before firing. During firing, the ceramic actuator and dielectric layer sinter together and are attached to each other.

A signal conditioning circuit or integrated circuit 80 is attached to mounting pads 52 typically by soldering. Integrated circuit 80 is electrically connected to wheatstone bridge 48 through circuit lines 50. Integrated circuit 80 can amplify and filter an electrical signal that is produced by wheatstone bridge 48. Integrated circuit 80 may include temperature compensation circuitry. Integrated circuit 80 may further include an analog to digital converter (A/D) that allows the analog signal produced by the wheatstone bridge 48 to be output as a digital signal.

Referring back to FIGS. 1-4, housing portion 201 has a support 275 that is located toward the back side of slot 205. Strain sensor 300 is mounted into slot 205 such that the back side 32 of sensor 300 rests on and is supported by support 275.

A spring carriage 400 can be mounted around sensor 300 in order to reduce noise and attenuate motion of sensor 300. Spring carriage 400 has spring fingers 402, tangs 404 and cross bar 406. Spring carriage 400 is mounted around sensor 300. Sensor 300 is held between tangs 404. Spring carriage 400 is mounted in cutout 224.

A wire harness 280 has a connector 281 on one end and several wires 282 that terminate in terminals 250. Terminals 250 are soldered or welded to terminals 54, 55 and 56. Connector 281 can be connected with an external electrical circuit.

Actuator 70 is adapted to be moved into contact with projection 230 in order that an applied load can be applied to actuator 70. The load acts upon actuator 70 and directly compresses resistors 41 and 42 under dielectric layer 60 between the actuator 70, substrate 30 and support 275. Resistors 43 and 44 are not compressed and are out of the path of the applied load.

Seat belt tension sensor 20 is attached to a vehicle floor or seat or other member (not shown) by a fastener 40 such as a bolt, rivet or screw. Fastener 40 goes through aperture 228 and is attached to a vehicle structure or seat. The fastener shown is threaded; however, other types of fasteners would work such as a rivet.

When a tension is applied to seat belt 30, housing 200 moves such that support 275 presses sensor 300 and actuator 70 into projection 230. As the tension is increased on belt 30, the strain sensitive resistors 41 and 42 will change resistance resulting in an electrical output signal that changes in proportion to the amount of tension in seat belt 30. This electrical signal is processed by electronic circuitry 80 and provided to an external electrical circuit by wire harness 280. In the present invention, the plate 220 is fixed or stationary and the housing 200 and sensor 300 is moved or flexed.

In a collision situation, a large force is applied to the tension sensor. The force applied to the seat belt moves housing 200 and flange 203 into contact with anchor plate 220. In this case, edge 234 is in contact with flange 203. The large force from the seat belt is transferred through the anchor plate 220 to fastener 40, which is attached to the vehicle structure or seat. Thus, in a collision, the large seat belt tension force is transferred from the seat belt to the vehicle structure. In this way, no further tension is applied to the strain sensor 300 and the strain sensor 300 is thus protected from excessive damaging forces by overload limit structure 22.

An electrical output signal is generated by the resistors 41 and 42 that is proportional to the magnitude of the tension in the seat belt and is transmitted over a wire harness 280 to a conventional air bag controller or occupant classification module (not shown). The air bag controller can then use the seat belt tension information to compute a more accurate profile of the seat occupant and use that information to control deployment of the airbag. This is the normal operational state of the seat belt tension sensor in which all of the seat belt tension is carried through the sensor 300.

In a situation where the vehicle is involved in a crash, the seat belt tension sensor operates in a different mode called a high load or crash state. In the high load state, the overload limit structure 22 carries the majority of tension placed on the seat belt. The amount of tension in the seat belt in a crash situation is much larger than in normal operation. If the strain sensor 300 was designed to carry all of this tension, it would not properly function as a strain gage sensor. Therefore, in a crash situation, the overload limit structure 22 carries the tension through the much stronger overload limit structure 22.

The present seat belt tension sensor has several advantages. It provides for isolation from shock events and protects the strain sensitive resistors. The use of the acuator directly contacting the projection results in fewer parts being needed to produce the seat belt tension sensor. The use of a spring carriage reduces rattling of the sensor and allows for the sensor to be quieter in a vehicle.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A seat belt tension sensor comprising:
   a housing having a first slot;
   a plate coupled with the housing, the plate having a second slot and a cutout, the first and second slots being adapted to be connected with a seat belt;
   a sensor retained by the housing and extending into the cutout, a first portion of the plate being adapted to be engaged by the sensor as tension is increased on the seat belt, the sensor being adapted to generate an electrical signal that is indicative of seat belt tension.

2. The seat belt tension sensor according to claim 1 wherein the housing moves relative to the plate.

3. The seat belt tension sensor according to claim 1 wherein movement of the housing relative to the plate is limited by engagement of a portion of the housing with a second portion of the plate.

4. The seat belt tension sensor according to claim 1 wherein the sensor is a strain sensitive resistor.

5. The seat belt tension sensor according to claim 1 wherein the sensor is mounted to a printed circuit board.

6. The seat belt tension sensor according to claim 5 wherein a wire harness is connected to the printed circuit board.

7. The seat belt tension sensor according to claim 5 wherein a signal conditioning circuit is mounted on the printed circuit board.

8. The seat belt tension sensor according to claim 1 wherein the plate is fixed to a vehicle.

9. A tension sensor comprising:
   a housing having a first slot;
   a plate having a first end and a second end, the first end located in the housing and the second end extending from the housing;
   a second slot located in the plate, the first and second slots being adapted to be connected with a seat belt;
   a cutout located in the plate; and
   a sensor retained by the housing and extending into the cutout, the sensor pressing on a first portion of the plate as tension is increased on the seat belt, the sensor being adapted to generate an electrical signal that is indicative of tension in the seat belt.

10. The tension sensor according to claim 9 wherein the housing moves relative to the plate.

11. The tension sensor according to claim 9 wherein movement of the housing relative to the plate is limited by engagement of a portion of the housing with a second portion of the plate.

12. The tension sensor according to claim 9 wherein the sensor is a strain sensitive resistor.

13. The tension sensor according to claim 9 wherein the housing has a pair of posts, the sensor being retained by the posts.

14. The tension sensor according to claim 9 wherein a spring carriage is coupled to the sensor.

15. The tension sensor according to claim 9 wherein the plate is fixed to a vehicle.

16. A seat belt tension sensor comprising:
   housing means for containing the seat belt tension sensor, the housing means configured to be coupled with a seat belt;
   plate means for transferring tension from the seat belt to a vehicle structure, the plate means coupled with the housing means;
   sensor means for measuring the amount of tension in the seat belt, the sensor means being coupled to the housing means, the sensor means configured to generate an electrical signal that is indicative of the amount of seat belt tension, the sensor means including a substrate, at least one strain sensitive resistor mounted on the substrate and an actuator mounted over the resistor; and
   the plate means cooperating with the housing means to form protection means for limiting the maximum force applied to the sensor means.

17. The seat belt tension sensor according to claim 16 wherein the actuator contacts the plate means.

18. The seat belt tension sensor according to claim 16 wherein the plate means further comprises:
   a plate having a slot, a cutout and an aperture.

19. The seat belt tension sensor according to claim 18 wherein a projection extends into the cutout.

20. The seat belt tension sensor according to claim 16 wherein spring means are coupled to the sensor means.

* * * * *